United States Patent
Balsiger et al.

(10) Patent No.: US 9,915,334 B2
(45) Date of Patent: Mar. 13, 2018

(54) FLEX SPLINE FOR USE WITH A COMPOUND HARMONIC GENERATOR

(71) Applicant: HAMILTON SUNDSTRAND CORPORATION, Windsor Locks, CT (US)

(72) Inventors: Derick S. Balsiger, Mayer, AZ (US); Nicholas R. Van De Veire, Tempe, AZ (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 326 days.

(21) Appl. No.: 14/884,935

(22) Filed: Oct. 16, 2015

(65) Prior Publication Data

US 2017/0108107 A1 Apr. 20, 2017

(51) Int. Cl.
*F16H 35/00* (2006.01)
*F16H 49/00* (2006.01)

(52) U.S. Cl.
CPC ..... *F16H 49/001* (2013.01); *F16H 2049/003* (2013.01)

(58) Field of Classification Search
CPC .................................................. F16H 49/001
USPC ......................................................... 74/640
See application file for complete search history.

(56) References Cited

U.S. PATENT DOCUMENTS

| | | | | |
|---|---|---|---|---|
| 3,196,713 A | * | 7/1965 | Robinson | F16H 49/001 74/17.8 |
| 3,986,412 A | * | 10/1976 | Farley | F16H 49/001 475/2 |
| 4,840,090 A | * | 6/1989 | Iwata | B25J 9/1025 74/640 |
| 5,042,380 A | | 8/1991 | Quinci | |
| 5,937,710 A | * | 8/1999 | Gould | F16H 35/008 74/640 |
| 7,421,990 B2 | * | 9/2008 | Taye | F01L 1/344 123/90.15 |
| 8,485,064 B2 | * | 7/2013 | Kanai | F16H 49/001 74/640 |

(Continued)

FOREIGN PATENT DOCUMENTS

DE 102009030516 A1 12/2009
DE 102011104504 A1 1/2016

(Continued)

OTHER PUBLICATIONS

EP SR, Issued Apr. 12, 2017, U310680EP, EP Patent Application No. 16194089, 9 pages.

*Primary Examiner* — Ha Dinh Ho
(74) *Attorney, Agent, or Firm* — Cantor Colburn LLP

(57) ABSTRACT

A method and system providing a flex spline for a compound harmonic generator having a harmonic wave generator, a primary ring gear, and a secondary ring gear, includes a primary flex spline with a first number of primary teeth, the primary flex spline driven by the harmonic wave generator and in meshed contact with the primary ring gear, and at least one secondary flex spline with a second number of secondary teeth, the at least one secondary flex spline driven by the harmonic wave generator and in meshed contact with the secondary ring gear, wherein the at least one secondary flex spline rotates independently from the primary flex spline.

20 Claims, 5 Drawing Sheets

(56) References Cited

U.S. PATENT DOCUMENTS

| | | | |
|---|---|---|---|
| 2007/0039414 A1* | 2/2007 | Takemura | F16H 49/001 74/640 |
| 2014/0206488 A1 | 7/2014 | Yeh | |
| 2014/0323264 A1 | 10/2014 | Yeh | |
| 2014/0345407 A1 | 11/2014 | Lin | |
| 2015/0075310 A1 | 3/2015 | Lunin et al. | |
| 2015/0114174 A1 | 4/2015 | Roopnarine | |

FOREIGN PATENT DOCUMENTS

| | | |
|---|---|---|
| EP | 1777044 A2 | 4/2007 |
| EP | 1782927 A2 | 5/2007 |
| FR | 2490607 | 3/1982 |
| JP | S59121255 A | 7/1984 |
| JP | S59212556 A | 12/1984 |
| JP | 2015059652 A | 3/2015 |
| WO | 2012101777 A1 | 8/2012 |

* cited by examiner

FLEX SPLINE FOR USE WITH A COMPOUND HARMONIC GENERATOR

BACKGROUND

The subject matter disclosed herein relates to flex splines, and more particularly, to a system and a method for providing a flex spline for use with a compound harmonic generator.

Typically, flight control surfaces on aircraft wing structures utilize actuators that are coupled to the flight control surfaces to control and guide the movement of the flight control surfaces between positions. Certain actuator applications, such as actuators for use with thin wing designs may utilize a compound harmonic generator to provide suitable gear reduction. The use of flex splines that can reduce stress and fatigue for a compound harmonic generator is desired.

BRIEF SUMMARY

According to an embodiment, a flex spline for a compound harmonic generator having a harmonic wave generator, a primary ring gear, and a secondary ring gear, includes a primary flex spline with a first number of primary teeth, the primary flex spline driven by the harmonic wave generator and in meshed contact with the primary ring gear, and at least one secondary flex spline with a second number of secondary teeth, the at least one secondary flex spline driven by the harmonic wave generator and in meshed contact with the secondary ring gear, wherein the at least one secondary flex spline rotates independently from the primary flex spline.

According to an embodiment, a method for operating a compound harmonic generator having a harmonic wave generator, a primary ring gear, and a secondary ring gear, includes providing a primary flex spline with a first number of primary teeth, providing at least one secondary flex spline with a second number of secondary teeth, engaging the primary flex spline in meshed contact with the primary ring gear, engaging the at least one secondary flex spline in meshed contact with the secondary ring gear, driving the primary flex spline via the harmonic wave generator, driving the at least one secondary flex spline via the harmonic wave generator, and rotating the primary flex spline independently from the at least one secondary flex spline.

According to an embodiment, a compound harmonic generator includes a harmonic wave generator, a motor to drive the harmonic wave generator, a primary ring gear, a secondary ring gear, and a flex spline including a primary flex spline with a first number of primary teeth, the primary flex spline driven by the harmonic wave generator and in meshed contact with the primary ring gear, and at least one secondary flex spline with a second number of secondary teeth, the at least one secondary flex spline driven by the harmonic wave generator and in meshed contact with the secondary ring gear, wherein the at least one secondary flex spline rotates independently from the primary flex spline.

Technical function of the embodiments described above includes that the at least one secondary flex spline rotates independently from the primary flex spline.

Other aspects, features, and techniques of the embodiments will become more apparent from the following description taken in conjunction with the drawings.

BRIEF DESCRIPTION OF THE DRAWINGS

The subject matter is particularly pointed out and distinctly claimed in the claims at the conclusion of the specification. The foregoing and other features, and advantages of the embodiments are apparent from the following detailed description taken in conjunction with the accompanying drawings in which like elements are numbered alike in the FIGURES:

DETAILED DESCRIPTION

Figure 1:
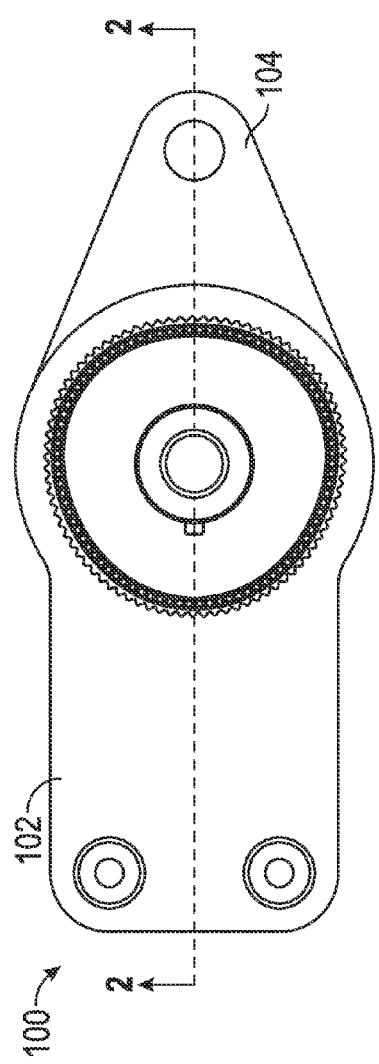
FIG. 1 is a plan view of one embodiment of a compound harmonic generator for use with a flex spline.
Figure 2:
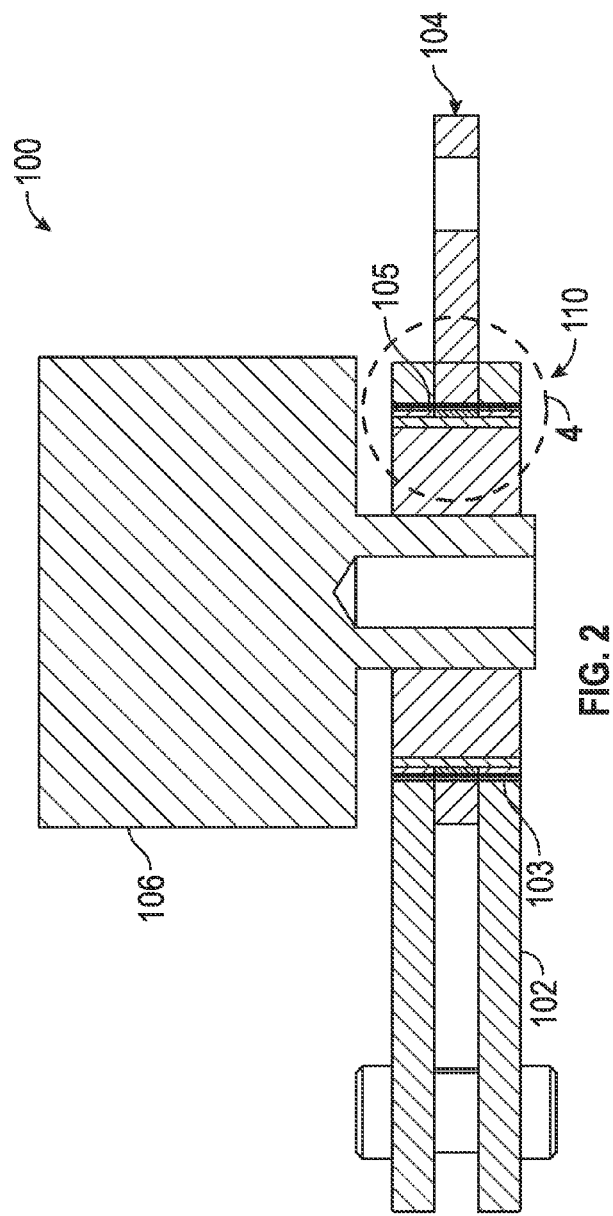
FIG. 2 is a cross sectional view of the compound harmonic generator of FIG. 1 along line 2-2 of FIG. 1.
Figure 3:
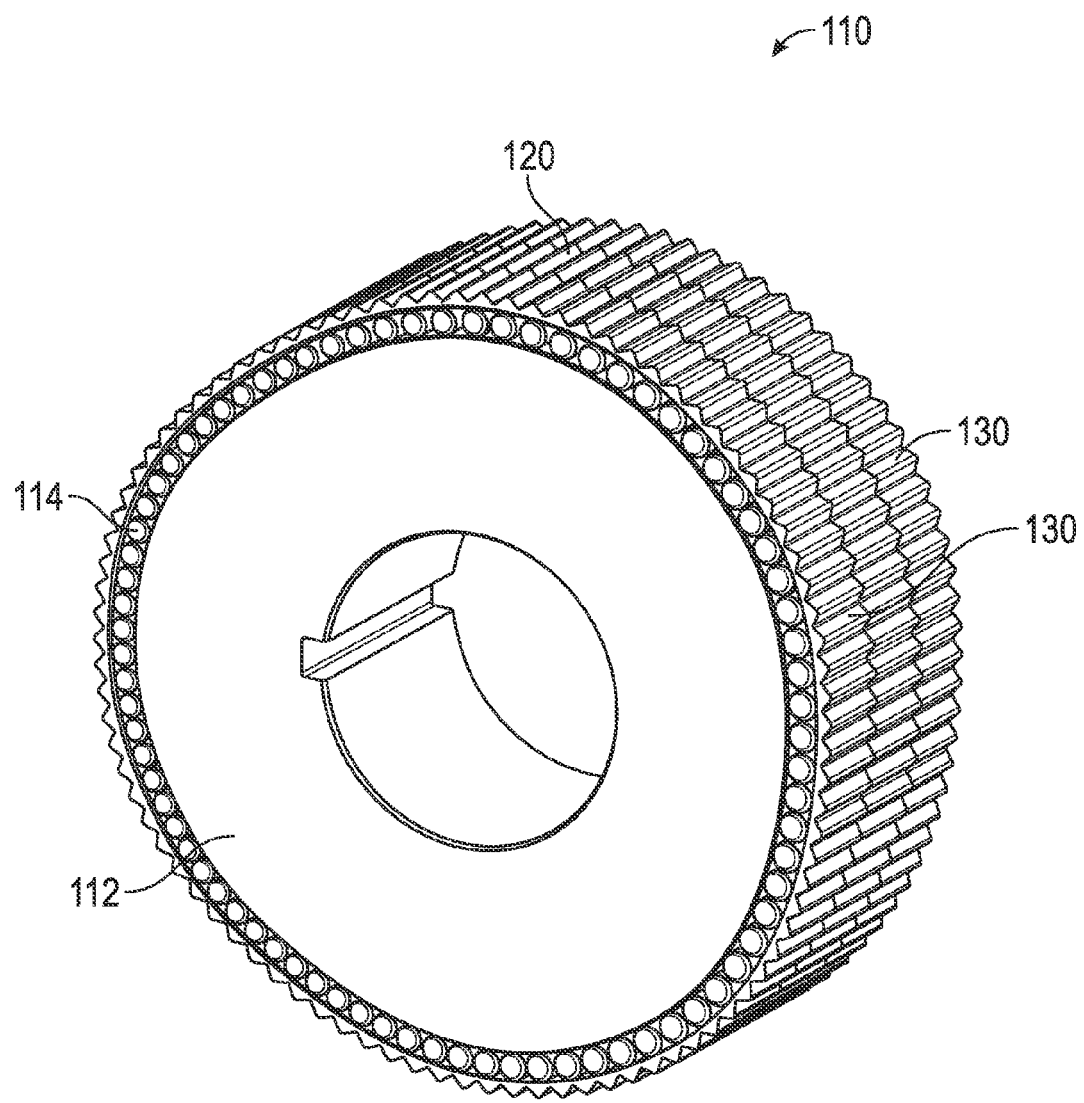
FIG. 3 is an isometric view of one embodiment of a harmonic wave generator assembly with a flex spline for use with a compound harmonic generator.

Referring now to the drawings, FIGS. 1-3 show a compound harmonic generator 100 and the harmonic wave generator assembly 110. In the illustrated embodiment, the compound harmonic generator 100 includes a ground arm 102 with a secondary ring gear 103, an output arm 104 with a primary ring gear 105, a motor 106 and a harmonic wave generator assembly 110 which includes a harmonic wave generator 112, a primary flex spline 120 and secondary flex splines 130.

As an overview, in the illustrated embodiment, the compound harmonic generator 100 (also called a strain wave gear assembly) utilizes the primary flex (flexible) spline 120 and at least one secondary flex (flexible) spline 130 that are rotationally independent. The primary flex spline 120 meshes with the primary ring gear 105 and the secondary flex splines 130 mesh with the secondary ring gear 103. In the illustrated embodiment, the harmonic wave generator 112 can rotate both the primary flex spline 120 and the secondary flex splines 130 independently. In the illustrated embodiment, the harmonic wave generator 112 is connected to a rotational input, such as the motor 106, or any other suitable rotational input. In the illustrated embodiment, the secondary ring gear 103 is coupled to the ground arm 102 and the primary ring gear 105 is coupled to the output arm 104. During operation, the primary flex spline 120 and the secondary flex splines 130 work together along with the primary ring gear 105 and the secondary ring gear 103 as a compact compounded gear drive to step down the rotational input of the motor 106. Advantageously, the compound harmonic generator 100 is simple and compact, yet maintains a relatively high gear ratio and relatively high torque-to-weight ratio. In certain embodiments, the compound harmonic generator 100 can be utilized in space limited applications such as control surface actuation in thin wing design aircrafts.

In the illustrated embodiment, the compound harmonic generator 100 includes at least one secondary ring gear 103 to mesh with the secondary flex splines 130. In certain embodiments, the compound harmonic generator 100 can include multiple secondary ring gears 103 corresponding to multiple secondary flex splines 130. In certain embodiments, the compound harmonic generator 100 can include multiple primary ring gears 105 corresponding to multiple primary flex splines 120. In the illustrated embodiment, the compound harmonic generator 100 can include two secondary ring gears 103 corresponding and meshing with the two secondary flex splines 130 and one primary ring gear 150 corresponding and meshing with one primary flex spline 120. In the illustrated embodiment, the secondary ring gears 103 are connected to a ground via the ground arm 102 which remains stationary relative to the harmonic wave generator assembly 110.

In the illustrated embodiment, the compound harmonic generator 100 includes a primary ring gear 105 to mesh with the primary flex spline 120. In the illustrated embodiment, the primary ring gear 105 is coupled to the output arm 104 to provide the rotational output of the compound harmonic generator 100.

In the illustrated embodiment, the motor 106 can be any suitable motor, including, but not limited to an electric motor, hydraulic motor, etc. In certain embodiments, the motor 106 may not provide the desired torque required for certain operations, requiring the use of the compound harmonic generator 100 to provide adequate gear reduction and torque multiplication. Advantageously, the use of the compound harmonic generator 100 allows for a low torque motor 106 to be utilized, while minimizing space needed. In the illustrated embodiment, the motor 106 rotates the harmonic wave generator assembly 110.

Referring to FIG. 3, the harmonic wave generator assembly 110 is shown. In the illustrated embodiment, the harmonic wave generator assembly 110 includes a harmonic wave generator 112, rolling elements 114, the primary flex spline 120, and at least one secondary flex spline 130. In the illustrated embodiment, the harmonic wave generator 110 is drive by the motor 106 to rotate.

In the illustrated embodiment, the harmonic wave generator 112 is rotated by the motor 106. In the illustrated embodiment, the harmonic wave generator 112 has an eccentric outer profile or other non-circular outer profile to facilitate the harmonic operation of the compound harmonic generator 100.

In the illustrated embodiment, rolling elements 114 are disposed between the harmonic wave generator 112 and the primary flex spline 120 and the secondary flex splines 130. As the harmonic wave generator 112 rotates, the rolling elements 114 provide radial support of the primary flex spline 120 and the secondary flex splines 130 while allowing rotation of the primary flex spline 120 and the secondary flex splines 130 independently of each other and of the harmonic wave generator 112. In certain embodiments, the primary flex spline 120 and the secondary flex splines 130 can rotate in a direction opposite to the direction of rotation of the harmonic wave generator 112. In the illustrated embodiment, the rolling elements 114 reduce rolling friction. The rolling elements 114 may be any suitable element, such as ball bearings, etc.

In the illustrated embodiment, the primary flex spline 120 is disposed between two secondary flex splines 130. In the illustrated embodiment, the primary flex spline 120 is a flexible gear. In certain embodiments, the primary flex spline 120 is made from spring steel or any other suitable material that is relatively thin, flexible and elastic. In the illustrated embodiment, the primary flex spline 120 has a generally hoop shape to allow for uniform deformation of the primary flex spline 120. The primary flex spline 120 is driven by the harmonic wave generator 112.

In the illustrated embodiment, the harmonic wave generator assembly 110 includes at least one secondary flex spline 130. The secondary flex splines 130 can be flexible gears. In the illustrated embodiment, the harmonic wave generator 110 can include two secondary flex splines 130 each disposed on each side of the primary flex spline 120. In certain embodiments, the secondary flex splines 130 are made from spring steel or any other suitable material that is relatively thin, flexible and elastic. In the illustrated embodiment, the secondary flex splines 130 have a generally hoop shape to allow for uniform deformation of the secondary flex splines 130. The secondary flex splines 130 can be driven by the harmonic wave generator 112. In the illustrated embodiment, the secondary flex splines 130 are rotationally independent from each other and from the primary flex spline 120.

Figure 4:
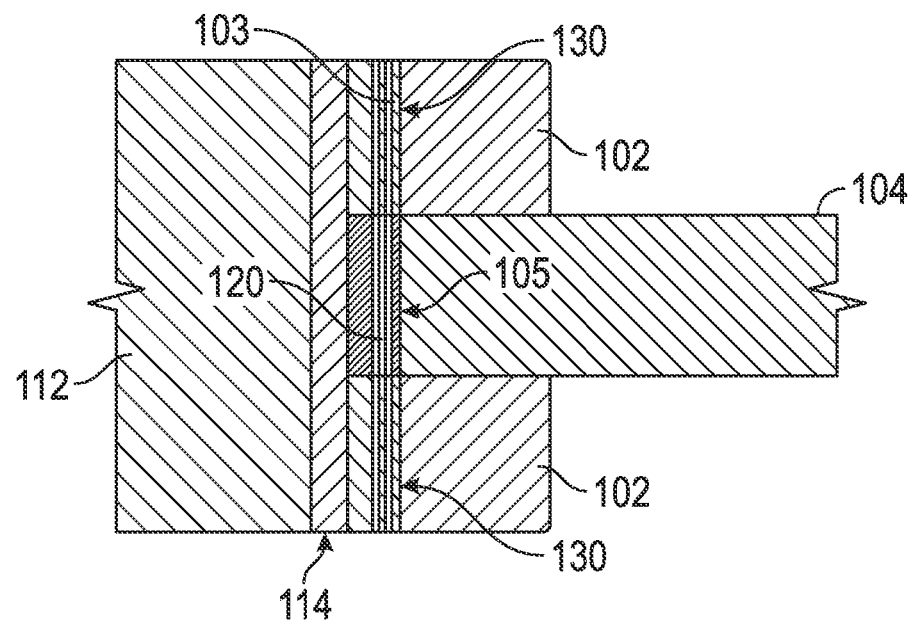
FIG. 4 is a schematic view of the harmonic wave generator assembly with the flex spline of FIG. 3.
Figure 5:
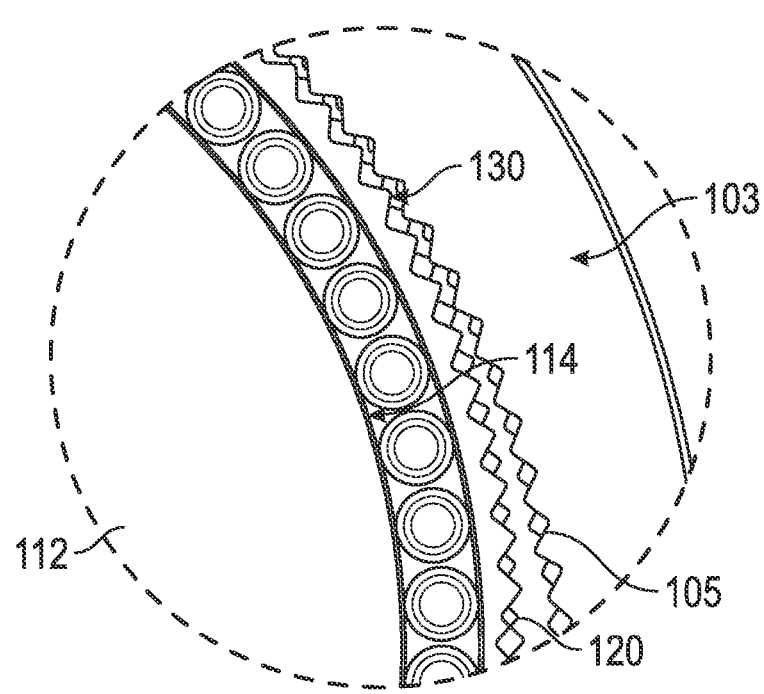
FIG. 5 is a detail view of the harmonic wave generator assembly with the flex spline of FIG. 3.

In FIGS. 4 and 5, the primary flex spline 120 and the secondary flex splines 130 are shown meshed with the primary ring gear 105 and the secondary ring gears 103. During operation, the harmonic wave generator 112 rotates the primary flex spline 120 and the secondary flex splines 130. In the illustrated embodiment, the harmonic wave generator 112 rotates the secondary flex splines 130 at a rate slower than the rotation rate of the harmonic wave generator 112. Similarly, the harmonic wave generator 112 rotates the primary flex spline 120 at a rate slower than the rotation rate of the harmonic wave generator 112, and slower than the rotation rate of the secondary flex splines 130. In the illustrated embodiment, the primary flex spline 120 has more teeth than the secondary flex splines 130, causing the difference in rotational speed. The secondary flex splines 130 are connected to the ground arm 102 via the secondary ring gears 103. The output from the primary ring gear 105 is output via the output arm 104. In addition to stepping down the rate of rotation of the motor 106, the compound harmonic generator 100 approximately steps up the torque from the motor 106 in an inverse relationship to the step down in rate.

In the illustrated embodiment, the primary flex spline 120 has a first number of teeth greater than the second number of teeth of the secondary flex splines 130 but an equal pitch diameter to that of the secondary flex splines 130, as best shown in FIG. 4. Accordingly, to maintain the same pitch diameter, the primary flex spline 120 can have a different gear tooth thickness compared to the secondary flex splines 130. In certain embodiments, the primary flex spline 120 can have a thicker gear tooth thickness than the gear teeth of the secondary flex splines 130. In other embodiments, the primary flex spline 120 can have a thinner gear tooth thickness than the gear teeth of the secondary flex splines 130. As best shown in FIGS. 4 and 5, since the primary flex spline 120 and the secondary flex splines 130 have equal pitch diameters, the corresponding ground arm 102, secondary ring gear 103, output arm 104, and primary ring gear 105 have corresponding dimensions.

In the illustrated embodiment, the primary flex spline 120 and the secondary flex splines 130 are rotationally independent. Advantageously, the construction of the primary flex spline 120 and the secondary flex splines 130 can prevent stress risers and failure due to fatigue. Advantageously, the construction of the primary flex spline 120 and the secondary flex splines 130 can prevent stress risers and failure due to fatigue.

Figure 6:
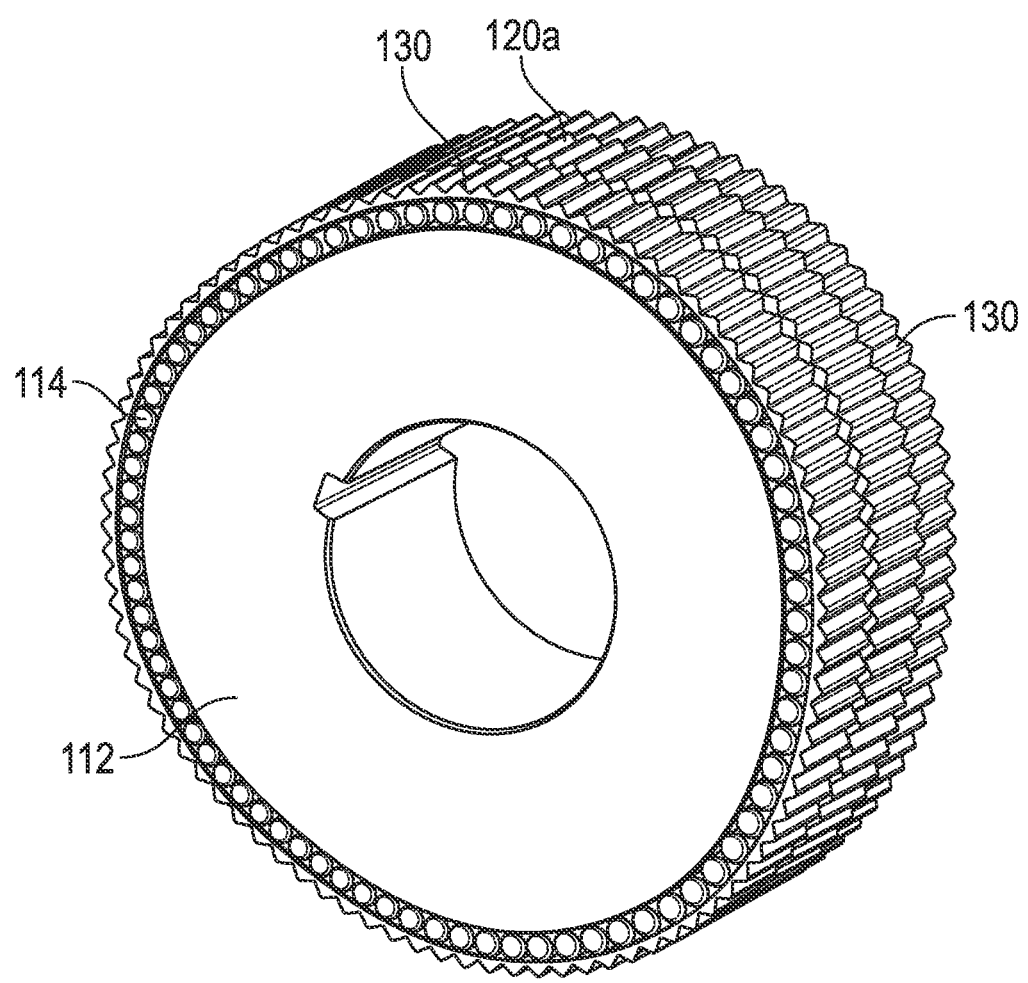
FIG. 6 is an isometric view of another embodiment of a harmonic wave generator assembly with a flex spline for use with a compound harmonic generator.
Figure 7:
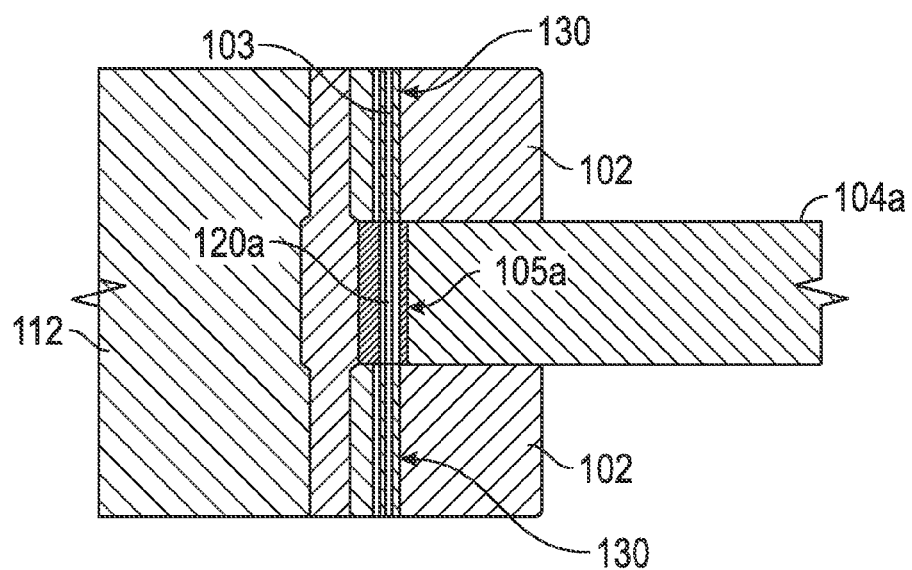
FIG. 7 is a schematic view of the harmonic wave generator assembly with the flex spline of FIG. 6.
Figure 8:
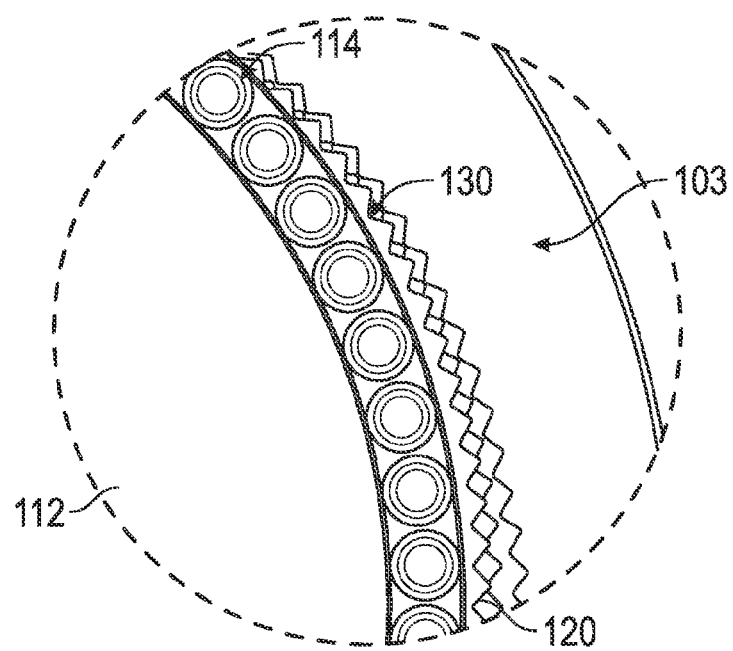
FIG. 8 is a detail view of the harmonic wave generator assembly with the flex spline of FIG. 6.

Referring to FIGS. 6-8, an alternative primary flex spline 120a is illustrated. In the illustrated embodiment, the primary flex spline 120a has a larger pitch diameter than the pitch diameter of the secondary flex splines 130. In certain embodiments, the primary flex spline 120a can have a smaller pitch diameter than the pitch diameter of the secondary flex splines 130. In the illustrated embodiment, the primary flex spline 120a has a greater number of teeth than the secondary flex splines 130. In certain embodiments, the primary flex spline 120a has a fewer number of teeth than the secondary flex splines 130. In certain embodiments, the primary flex spline 120a can have a teeth thickness that is the same as the secondary flex splines 130. In certain embodiments, the primary flex spline 120 can have teeth thickness that is thinner than the teeth thickness of the secondary flex splines 130.

As shown in FIG. 7, the pitch diameter of primary flex spline 120a may differ from the secondary flex splines 130. Therefore, in certain embodiments, the primary ring gear 105a and the output arm 104a are sized appropriately according to the pitch diameter of the primary flex spline 120a. As shown in FIGS. 7 and 8, if the primary flex spline 120a has a pitch diameter greater than the pitch diameter of secondary flex splines 130, the primary ring gear 105a and the output arm 104a are recessed relative to the secondary ring gears 103 and the ground arm 102.

The terminology used herein is for the purpose of describing particular embodiments only and is not intended to be limiting of the embodiments. While the description of the present embodiments has been presented for purposes of illustration and description, it is not intended to be exhaustive or limited to the embodiments in the form disclosed. Many modifications, variations, alterations, substitutions or equivalent arrangement not hereto described will be apparent to those of ordinary skill in the art without departing from the scope and spirit of the embodiments. Additionally, while various embodiments have been described, it is to be understood that aspects may include only some of the described embodiments. Accordingly, the embodiments are not to be seen as limited by the foregoing description, but are only limited by the scope of the appended claims.

What is claimed is:

1. A flex spline for a compound harmonic generator having a harmonic wave generator, a primary ring gear, and a secondary ring gear, the flex spline comprising:
    a primary flex spline with a first number of primary teeth, the primary flex spline driven by the harmonic wave generator and in meshed contact with the primary ring gear; and
    at least one secondary flex spline with a second number of secondary teeth, the at least one secondary flex spline driven by the harmonic wave generator and in meshed contact with the secondary ring gear, wherein the at least one secondary flex spline rotates independently from the primary flex spline.

2. The flex spline of claim 1, wherein a first pitch diameter of the primary flex spline is equal to a second pitch diameter of the at least one secondary flex spline.

3. The flex spline of claim 1, wherein a first pitch diameter of the primary flex spline is different than a second pitch diameter of the at least one secondary flex spline.

4. The flex spline of claim 1, wherein a first tooth thickness of the primary flex spline is different than a second tooth thickness of the at least one secondary flex spline.

5. The flex spline of claim 1, further comprising a rolling element to radially support the primary flex spline and the at least one secondary flex spline.

6. The flex spline of claim 1, wherein the at least one secondary flex spline includes a first secondary flex spline disposed axially adjacent to the primary flex spline and a second secondary flex spline disposed axially adjacent to the primary flex spline and opposite to the first secondary flex spline.

7. A method for operating a compound harmonic generator having a harmonic wave generator, a primary ring gear, and a secondary ring gear, the method comprising:
    providing a primary flex spline with a first number of primary teeth;
    providing at least one secondary flex spline with a second number of secondary teeth;
    engaging the primary flex spline in meshed contact with the primary ring gear;
    engaging the at least one secondary flex spline in meshed contact with the secondary ring gear;
    driving the primary flex spline via the harmonic wave generator;
    driving the at least one secondary flex spline via the harmonic wave generator; and
    rotating the primary flex spline independently from the at least one secondary flex spline.

8. The method of claim 7, wherein a first pitch diameter of the primary flex spline is equal to a second pitch diameter of the at least one secondary flex spline.

9. The method of claim 7, wherein a first pitch diameter of the primary flex spline is different than a second pitch diameter of the at least one secondary flex spline.

10. The method of claim 7, wherein a first tooth thickness of the primary flex spline is different than a second tooth thickness of the at least one secondary flex spline.

11. The method of claim 7, further comprising radially supporting the primary flex spline and the at least one secondary flex spline via a rolling element.

12. The method of claim 7, wherein the at least one secondary flex spline includes a first secondary flex spline disposed axially adjacent to the primary flex spline and a second secondary flex spline disposed axially adjacent to the primary flex spline and opposite to the first secondary flex spline.

13. A compound harmonic generator comprising:
    a harmonic wave generator;
    a motor to drive the harmonic wave generator;
    a primary ring gear;
    a secondary ring gear; and
    a flex spline comprising:
        a primary flex spline with a first number of primary teeth, the primary flex spline driven by the harmonic wave generator and in meshed contact with the primary ring gear; and
        at least one secondary flex spline with a second number of secondary teeth, the at least one secondary flex spline driven by the harmonic wave generator and in meshed contact with the secondary ring gear, wherein the at least one secondary flex spline rotates independently from the primary flex spline.

14. The compound harmonic generator of claim 13, wherein a first pitch diameter of the primary flex spline is equal to a second pitch diameter of the at least one secondary flex spline.

15. The compound harmonic generator of claim 13, wherein a first pitch diameter of the primary flex spline is different than a second pitch diameter of the at least one secondary flex spline.

16. The compound harmonic generator of claim 13, wherein a first tooth thickness of the primary flex spline is different than a second tooth thickness of the at least one secondary flex spline.

17. The compound harmonic generator of claim 13, further comprising a rolling element to radially support the primary flex spline and the at least one secondary flex spline.

18. The compound harmonic generator of claim 13, further comprising an output arm coupled to the primary ring gear.

19. The compound harmonic generator of claim 13, further comprising a ground arm coupled to the secondary ring gear.

20. The compound harmonic generator of claim 13, wherein the at least one secondary flex spline includes a first secondary flex spline disposed axially adjacent to the primary flex spline and a second secondary flex spline disposed axially adjacent to the primary flex spline and opposite to the first secondary flex spline.

* * * * *